United States Patent Office 2,878,132
Patented Mar. 17, 1959

2,878,132
REFRACTORY PRODUCT AND METHOD OF MANUFACTURE

James R. Bachman, Columbus, Ohio, and George R. Eusner, McKeesport, Pa., assignors to United States Steel Corporation, a corporation of New Jersey No Drawing. Application August 13, 1957
Serial No. 677,851

6 Claims. (Cl. 106—67)

This invention relates to an improved refractory body for use in metallurgical vessels and furnaces where slag resistance is a primary consideration, more particularly to an improved alumina-silica refractory body of the class commonly referred to as the "high-alumina" refractories and the process of making the same.

Conventional high-alumina refractories are made in several grades which vary in alumina content from 50 to 85%, and consist of a high-fired bauxite grog bonded by a clay matrix. The matrix or bonding material constitutes the major portion of the surface area of the brick or other refractory shape. Although alumina possesses good resistance to metallurgical slags, the presently available "high-alumina" brick is rapidly destroyed when subjected to ferruginous slags. In addition, the conventional brick exhibits a high porosity (apparent porosity, usually being in excess of 25%) and poor spalling resistance.

The present invention provides a new high-alumina refractory possessing greatly improved resistance to ferruginous slags together with lower porosity and greater spalling resistance than heretofore available, and is characterized as an aggregate of discrete particles of calcined fireclay dispersed in a matrix of mullite. The improved properties derive from the foregoing characteristic placement of minerals, which placement is the reverse of that obtaining in conventional high-alumina brick and requires modification of the usual method of manufacture.

The raw materials used in preparing the new refractory are essentially the same as those employed in the manufacture of conventional high-alumina brick, i. e., bauxite or other suitable alumina-bearing material and fireclay. In the present instance, however, the clay, preferably a flint clay, is calcined and crushed to provide the coarse fractions or grog for the brick mix; while material for the matrix is prepared by blending comminuted clay and alumina-bearing material in proportions to contain not less than 72% $Al_2O_3$, firing the blend at a temperature to form mullite, $3(Al_2O_3) \cdot 2(SiO_2)$, and then crushing and grinding the resulting mullite to furnish the fine fractions for the brick mix.

In preparing the mullite, the alumina-bearing material can be high-purity alumina but equally good results are obtained with a high-grade bauxite, the latter however must contain at least 80% $Al_2O_3$. The use of such natural occurring material as the source of alumina is of course preferable from a cost viewpoint. Any good grade of fireclay can be used; a clay having a pyrometric cone equivalent of 33 to 34 being preferred. The mullite-forming materials may be blended raw or calcined prior to grinding and mixing. The blend may be fired either as a bulk mix in a rotary kiln or as pressed dobies in a periodic or tunnel kiln; a firing temperature of at least 2900° F. and preferably between 3000° and 3100° F. should be used. The resulting mullite is pulverized in any conventional manner to about −80 mesh; while complete pulverization is not essential, excessive amounts of +80 material should be avoided and particles larger than −10 mesh should be screened-out and returned to the grinder.

The calcined flint-clay for the grog is crushed to pass 4 mesh and screened, if necessary, to remove excessive fines, i. e., material smaller than −80.

Suitable proportions of the materials prepared as described above are then mixed, tempered with water to provide plasticity, molded into a body of desired shape, dried and fired at a temperature in excess of 2900° F. to fuse the mullite and bond the fireclay grog into the refractory of the present invention. The proportions of the grog and matrix materials can be varied over the following range—

| | Percent by weight |
|---|---|
| Grog—calcined flint-clay | 35–70 |
| Matrix material—mullite | 65–30 | to provide several grades of refractory based on alumina content. Within this range, nominal compositions comprising 65 grog:35 mullite and 45 grog:55 mullite are particularly outstanding. These two compositions provide refractories containing about 50 and 60% $Al_2O_3$, respectively, and have properties superior to the conventional 70% alumina refractory currently available, as shown by test data tabulated below:

TABLE I
Properties

| Brick | Apparent porosity, percent | Bulk density, g./cc. | Slagging,[1] inches | Load deform.,[2] percent | Spalling loss,[3] percent | Modulus of rupture, p. s. i. |
|---|---|---|---|---|---|---|
| Mix 1: | | | | | | |
| Fired 2,900° F | 21.2 | 2.25 | 1.00 | 0.5 | 0.0 | 2,120 |
| Fired 3,000° F | 17.8 | 2.35 | 0.75 | 0.2 | 0.0 | 2,230 |
| Fired 3,100° F | 11.0 | 2.54 | 0.65 | 0.2 | 0.5 | 3,310 |
| Fired 3,150° F | 5.6 | 2.58 | 0.25 | 0.0 | 23.4 | ND |
| Mix 2: | | | | | | |
| Fired 2,900° F | 22.0 | 2.27 | 0.85 | 0.5 | 0.0 | 2,220 |
| Fired 3,000° F | 18.3 | 2.36 | 0.55 | 0.3 | 0.0 | 2,910 |
| Fired 3,100° F | 12.1 | 2.51 | 0.50 | 0.0 | 0.0 | 3,000 |
| Fired 3,150° F | 6.8 | 2.56 | 0.20 | 0.0 | 16.3 | ND |
| Mix 3: | | | | | | |
| Fired 3,020° F | 18.5 | 2.28 | 0.90 | 0.3 | 0.0 | 2,310 |
| Fired 3,050° F | 14.3 | 2.36 | ND | 0.2 | 0.0 | 2,780 |
| Fired 3,070° F | 11.6 | 2.40 | 0.70 | ND | 0.0 | ND |
| Fired 3,090° F | 10.4 | 2.42 | 0.60 | 0.1 | 0.0 | 3,330 |
| Fired 3,140° F | 4.4 | 2.48 | 0.25 | 0.0 | 22.3 | 3,840 |
| High-fired fireclay | 10.7 | 2.34 | 0.65 | 2.6 | 24.2 | 2,980 |
| 70% $Al_2O_3$ Brick "A" | 32.2 | 2.13 | 1.00 | 6.6 | 11.6 | 1,740 |
| 70% $Al_2O_3$ Brick "B" | 25.2 | 2.32 | 0.95 | 6.0 | 8.2 | 1,560 |
| 70% $Al_2O_3$ Brick "C" | 22.4 | 2.56 | 0.85 | 9.1 | 9.8 | 1,070 |

[1] 100 g. of iron oxide were placed on 4½ by 4½ by 2½ inch specimen; the specimens were heated to 2,910° F. for 1 hour, and the depth of slag penetration was measured.
[2] Brick were held for 1½ hours at 2,750° F., under a load of 25 p. s. i.
[3] ASTM test Designation C122-47 for super-duty fireclay brick.

Brick identified as "70% $Al_2O_3$"—"A," "B" and "C" are the product of three different manufacturers and are representative of the best conventional high alumina refractories heretofore available; the brick identified "high-fired fireclay" is representative of the best super-duty fireclay refractory currently marketed. Upon comparison of the tabulated properties, it is apparent that the present invention provides a high-alumina refractory, which is superior to conventional alumina refractories on all counts, possessing exceptional resistance to ferruginous slag, to spalling, and to deformation under load, together with the low porosity and high strength of a super-duty fireclay brick.

Brick identified as mixes 1, 2 and 3 are typical products of the above outlined methods of manufacture. In all three mixes, the grog consisted of a flint clay calcined at 2850–2950° F. and crushed to pass 4 mesh. The mullite for mixes 1 and 2 was prepared from fireclay and bauxite; that for mix 3 from fireclay and high purity alumina. Analyses of the raw materials used in the mullite preparation are tabulated below.

TABLE II

*Analysis of indicated materials, percent*

| Oxide | Fireclay | Bauxite | Alumina |
|---|---|---|---|
| $Al_2O_3$ | 37.89 | 87.3 | 99.58 |
| $SiO_2$ | 46.09 | 5.5 | 0.02 |
| $Fe_2O_3$ | 0.53 | 3.3 | 0.03 |
| $TiO_2$ | 1.09 | 3.3 | |
| CaO | 0.10 | | |
| MgO | 0.16 | | |
| $Na_2O$ | 0.46 | | 0.13 |
| $K_2O$ | 0.15 | | |
| L. O. I. | 13.66 | | |
| Total | 100.13 | 99.4 | 99.76 |

The fireclay was ground to pass 100 mesh; the bauxite and alumina, to pass 80 mesh. These materials, i. e., clay and bauxite or clay and alumina, were blended in proportions to form mullite, $3(Al_2O_3) \cdot 2(SiO_2)$, i. e., to provide a mixture containing about 72% by weight $Al_2O_3$ total. Sufficient water was added to achieve a moldable mixture which was pressed into dobies at 5000 p. s. i. The dobies were then burned at 3050° F. for 6 hours, cooled, pulverized and screened. The grog and mullite prepared as described above were then combined according to the following batch formulae.

TABLE III

| Mix No. | Grog—Calcined flint clay | | | | Matrix—Mullite | | | Net $Al_2O_3$ content, percent |
|---|---|---|---|---|---|---|---|---|
| | −4 +10 mesh | −10 +20 mesh | −20 +80 mesh | −80 mesh | −10 +20 mesh | −20 +80 mesh | −80 mesh | |
| 1 | 11 | 39 | 10 | 5 | 0 | 0 | 35 | 52 |
| 2 | 11 | 29 | 5 | 0 | 10 | 5 | 40 | 58 |
| | −4 +8 | −8 +10 | −10 +20 | | −20 +35 | −35 +100 | −100 | |
| 3 | 6 | 10 | 39 | | 10 | 5 | 30 | 58 |

Each batch was mixed with 2% water and 3% organic binder for 10 minutes in a muller-type mixer. Following which the mixtures were pressed at 5000 p. s. i. into 9 x 4½ x 2½ inch brick. After drying, individual lots of brick from each batch were fired at the several temperatures recorded in Table I. During firing the bricks were maintained at temperature for 3 to 5 hours.

As shown by the test data, Table I, properties of the new refractory are influenced by the firing temperature and temperatures below 2900° F. should not be used. In general, properties improve as the firing temperature is increased, with the exception of resistance to spalling which decreases very markedly when the brick mixes were fired at 3140 to 3150° F. An optimum balance of properties is achieved by firing at about 3100° F., and we prefer this practice for most applications. However, for applications, such as hot-metal mixer linings, wherein spalling resistance is of relative minor importance, the higher burning temperatures can be used to advantage to develop maximum resistance to slag.

While we have shown and described certain specific embodiments of our invention, we do not wish to be limited exactly thereto since various modifications may be made without departing from the scope of the appended claims.

We claim:

1. The method of making a refractory body which includes mixing comminuted mullite with a grog of crushed calcined clay in proportions ranging from 35% grog:65% mullite to 70% grog:30% mullite, tempering said mixture with sufficient water to render the mixture moldable, forming therefrom a body of desired shape and firing said body at a temperature of at least 2900° F.

2. As a new article of manufacture, a refractory body produced in accordance with claim 1 characterized by discrete particles of calcined clay dispersed in a matrix of mullite and by resistance to ferruginous slags.

3. The method of making a refractory body comprising calcining and crushing clay to provide a grog for said refractory body, mixing a comminuted alumina-bearing material with comminuted clay in proportions to provide a mixture containing at least 72% $Al_2O_3$, firing said mixture at a temperature of at least 2900° F. to form mullite, pulverizing the resulting mullite to provide matrix material for said refractory body, mixing said grog and matrix material in proportions ranging from 35% grog:65% matrix material to 70% grog:30% matrix material; tempering said last mentioned mixture with sufficient water to render the mixture moldable, forming therefrom a body of desired shape, and firing said body at a temperature of at least 2900° F.

4. As a new article of manufacture, a refractory body produced in accordance with claim 3 characterized by discrete particles of calcined clay dispersed in a matrix of mullite and by resistance to ferruginous slags.

5. The method of making a refractory body comprising calcining and crushing flint clay to provide a grog for said refractory body, mixing a comminuted bauxite containing at least 80% $Al_2O_3$ with comminuted fireclay in proportions to provide a mixture containing at least 72% $Al_2O_3$, firing said mixture at a temperature between 3000° and 3100° F. to form mullite, pulverizing the resulting mullite to provide matrix material for said refractory body, mixing said grog and matrix material in proportions ranging from 45% grog:55% matrix material to 65% grog:35% matrix material; tempering said last mentioned mixture with sufficient water to render the mixture moldable, forming therefrom a body of desired shape, and firing said body at a temperature of about 3100° F.

6. As a new article of manufacture, a refractory body produced in accordance with claim 5 characterized by discrete particles of calcined clay dispersed in a matrix of mullite and by resistance to ferruginous slags.

References Cited in the file of this patent

UNITED STATES PATENTS 1,802,298     Willetts     Apr. 21, 1931